United States Patent
Feuerstraeter et al.

(10) Patent No.: US 6,584,109 B1
(45) Date of Patent: Jun. 24, 2003

(54) AUTOMATIC SPEED SWITCHING REPEATER

(75) Inventors: Mark T. Feuerstraeter, Rancho Cordova, CA (US); Steven Kubes, El Dorado Hills, CA (US)

(73) Assignee: Level One Communications, Inc., Sacramento, CA (US)

(*) Notice: Subject to any disclaimer, the term of this patent is extended or adjusted under 35 U.S.C. 154(b) by 0 days.

(21) Appl. No.: 09/275,291

(22) Filed: Mar. 24, 1999

Related U.S. Application Data

(63) Continuation of application No. 08/600,414, filed on Feb. 9, 1996, now abandoned.

(51) Int. Cl.[7] .............................. H04L 12/28; H04J 3/16
(52) U.S. Cl. ........................................ 370/401; 370/465
(58) Field of Search .................................. 370/230, 235, 370/249, 241, 252, 253, 389, 392, 401, 402, 403, 412, 419, 423, 437, 447, 438, 445, 451, 465, 462, 467, 468; 710/26, 56

(56) References Cited

U.S. PATENT DOCUMENTS

| | | | | |
|---|---|---|---|---|
| 5,436,902 A | * | 7/1995 | McNamara et al. | 370/401 |
| 5,546,385 A | * | 8/1996 | Caspi et al. | 370/412 |
| 5,596,575 A | | 1/1997 | Yang et al. | |
| 5,600,650 A | | 2/1997 | Oskouy | |
| 5,604,867 A | | 2/1997 | Harwood | |
| 5,666,359 A | | 9/1997 | Bennett et al. | |
| 5,742,602 A | | 4/1998 | Bennett | |
| 5,796,732 A | * | 8/1998 | Mazzola et al. | 370/462 |
| 5,809,026 A | * | 9/1998 | Wong et al. | 370/445 |
| 5,953,340 A | * | 9/1999 | Scott et al. | 370/401 |
| 6,075,773 A | * | 6/2000 | Clark et al. | 370/241 |
| 6,167,054 A | * | 12/2000 | Simmons et al. | 370/412 |
| 6,195,334 B1 | * | 2/2001 | Kadambi et al. | 370/447 |
| 6,226,338 B1 | * | 5/2001 | Earnest | 710/56 |
| 6,298,067 B1 | * | 10/2001 | Tang | 370/447 |
| 6,301,256 B1 | * | 10/2001 | Vasa | 370/401 |
| 6,370,115 B1 | * | 4/2002 | Smith | 370/461 |
| 6,385,208 B1 | * | 5/2002 | Findlater et al. | 370/401 |

FOREIGN PATENT DOCUMENTS

| | | |
|---|---|---|
| WO | WO 91 16679 | 10/1991 |
| WO | WO 95 34976 | 12/1995 |

OTHER PUBLICATIONS

Lee Goldberg, "100Base–T4 Transceiver Simplifies Adapter, Repeater, and Switch Designs", *Electronic Design*, vol. 43, No. 6, Mar. 20, 1995, pp. 155–160.

Kevin Tolly, Grading Smart Hubs for Corporate Networking:, *Data Communications*, vol. 21, No. 17, Nov. 21, 1992, pp. 56–58, 60–62, 64, 66, 68.

Alan R. Albrecht, et al., "Introduction to 100VG–anyLAN and the IEEE 802.12 Local Area Network Standard", *Hewlett–Packard Journal*, vol. 46, No. 4, Aug. 1985, pp. 6–12.

Crayford, "Fast Ethernet' Gets Plug–and–Play", Wescon/95: Conference Record 1995, pp. 354–359.

* cited by examiner

*Primary Examiner*—Chau Nguyen
*Assistant Examiner*—Andy Lee
(74) *Attorney, Agent, or Firm*—Merchant & Gould P.C.

(57) ABSTRACT

A network repeater having automatic speed switching capability. The repeater includes a first repeater logic for connecting devices operating at the first rate to a first backplane, a second repeater logic for connecting devices operating at the second rate to a second backplane, and a port switching fabric, coupled to the first and second repeater logic, for determining the transmission rate of a signal at a port and routing the signal to one of the repeater logic according to the transmission rate determination. The repeater includes a serial controller for accessing internal management counters, LEDs for providing status information about the repeater and a media access controller for controlling functions including the transmission loopback and reception of Ethernet frames.

23 Claims, 9 Drawing Sheets

AUTOMATIC SPEED SWITCHING REPEATER

This application is a Continuation of application Ser. No. 08/600,414, filed Feb. 9, 1996, abandoned which application(s) are incorporated herein by reference.

BACKGROUND OF THE INVENTION

1. Field of the Invention.

This invention relates in general to a network device, and in particular, to a network repeater having automatic speed switching capability.

2. Description of Related Art.

Recent advancements in the art of data communications have provided great strides in resource sharing amongst computer systems through the use of networks which offer reliable high-speed data channels. Networks allow versatility by defining a common standard for communication so that information independent of vendor equipment may be exchanged across user applications. As the popularity of networks increase so does the demand for performance. More sophisticated protocols are being established to meet this demand and are utilizing existing twisted pair wires in office buildings so that virtually all computer literate users have access to resources with minimal expense.

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model performs a specific data communications task, a service to and for the layer that precedes it (e.g., the network layer provides a service for the transport layer). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller transaction can be tracked through the multilayer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a users application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed.

The ISO has specifically defined all seven layers, which are summarized below in the order in which the data actually flows as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems and is often reliable (i.e., layer 4 at the destination confirms the request for a connection, so to speak, that it has received from layer 4 at the source).

Layer 3, the network layer, provides routing and relaying of data through the network (among other things, at layer 3 on the outbound side an address gets slapped on the envelope which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data moves across those physical connections from layer 1 at the source to layer 1 at the destination.

The primary standard for Local and Metropolitan Area Network technologies is governed by IEEE Std. 802. IEEE Std. 802 describes the relationship among the family of 802 standards and their relationship to the ISO OSI Basic Reference Model. Generally, IEEE Std. 802 prescribes the functional, electrical and mechanical protocols, and the physical and data link layers for Local and Metropolitan Area Networks (LAN/MAN) The specification augments network principles, conforming to the ISO seven-layer model for OSI, commonly referred to as "Ethernet". In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted.

While there are several LAN technologies in use today, Ethernet is by far the most popular. The definitions of an Ethernet Repeater functions are contained in the IEEE 802.3 specification, which is herein incorporated by reference. This standard defines attributes which can be used by a management function within an IEEE 802.3 Ethernet Repeater to monitor network behavior.

The vast majority of computer vendors today equip their products with 10 Mbps Ethernet attachments, making it possible to link all manner of computers with an Ethernet LAN. Nevertheless, the need for faster data transmission has led to the development of Fast Ethernet standards which carry Ethernet frames at 100 Mbps. When the IEEE standardization committee began work on a faster Ethernet system, two approaches were presented. One approach was to speed up the original Ethernet system to 100-Mbps, keeping the original CSMA/CD medium access control mechanism. This approach is called 100BASE-T Fast Ethernet.

Another approach presented to the committee was to create an entirely new medium access control mechanism, one based on hubs that controlled access to the medium using a "demand priority" mechanism. This new access control system transports standard Ethernet frames, but it does it with a new medium access control mechanism. This system was further extended to allow it to transport token ring frames as well. As a result, this approach is now called 100VG-AnyLAN.

The IEEE decided to create standards for both approaches. The 100BASE-T Fast Ethernet standard described here is part of the original 802.3 standard, which was incorporated by reference earlier. The 100VG-AnyLAN system is standardized under a new number: IEEE 802.12, herein incorporated by reference.

The Fast Ethernet standards both include mechanisms for Auto-Negotiation of the media speed. As the 100 Mbps standard becomes more widely adopted, computers are being equipped with an Ethernet interface that operates at both 10 Mbps and 100 Mbps. The Auto-Negotiation function is an optional part of the Ethernet standard that makes it possible for devices to exchange information about their abilities over a link segment. This, in turn, allows the devices to perform automatic configuration to achieve the best possible mode of operation over a link. At a minimum, Auto-Negotiation can provide automatic speed matching for multi-speed devices at each end of a link. Multi-speed Ethernet interfaces can then take advantage of the highest speed offered by a multi-speed hub port.

The Auto-Negotiation protocol includes automatic sensing for other capabilities as well. For example, a switched hub that is capable of supporting full duplex operation on some or all of its ports can advertise that fact with the Auto-Negotiation protocol. Interfaces connected to the switch hub port that also support full duplex operation can then configure themselves to use the full duplex mode in interaction with the hub.

Integrated multi-port repeaters exist which provide separately either 10 Mb/s or 100 Mb/s functionality. However, the incorporation of 10 Mb/s or 100 Mb/s repeater functionality within a single repeater is beyond the scope of IEEE 802.3 standard.

FIG. 9 illustrates the traditional solution 900 of providing 100 Mbps functionality in a network system along with 10 Mbps functionality. A 10 Mbps repeater 910 is connected to a 100 Mbps repeater 912 through a bridge 914. Ten Mbps devices 916 are connected to the 10 Mbps repeater 910. One hundred Mbps devices 918 are connected to the 100 Mbps repeater. Upgrading a device to Fast Ethernet requires disconnecting the device 916 from the 10 Mbps repeater 910 and re-routing cable from the device 916 to the 100 Mbps repeater 914. However, this procedure is time consuming and confusing. Furthermore, to provide the dual speed functionality, both types of repeaters and a bridge must be purchased. Thus, the traditional solution is too expensive.

If a 10 Mbps segment is replaced with a 100 Mbps segment, fast link pulses (FLPs) will be received by the repeater hub, and the Auto-Negotiation protocol will result in the hub port operating at 100-Mbps as long as all interfaces connected to the repeater hub can operate at 100-Mbps. The change from 10-Mbps to 100-Mbps will occur with no manual intervention.

Auto-Negotiation ensures that all devices attached to the hub are operating at the highest common denominator. Since a repeater hub is used to create a shared signal channel for all devices attached to the repeater ports, that shared signal channel must operate no faster than the slowest device attached to it.

If an repeater hub has one of its ports attached to a device that only supports 10 Mbps transmissions while the rest of the ports are attached to 100 Mbps devices, the hub will negotiate a speed of 10-Mbps for all ports, since that is the highest common denominator for all repeated ports. When every device attached to the repeater hub is capable of operating at 100-Mbps, then the hub will negotiate 100-Mbps for all ports.

If there is no common technology detected at either end of the link, then the Auto-Negotiation protocol will not make a connection, and the port will be left in the off condition.

It can therefore be seen that there is a need for a repeater which provides both 10 Mb/s or 100 Mb/s functionality.

It can also be seen that there is a need for a repeater which automatically switches to either a 10 Mb/s backplane/segment or a 100 Mb/s backplane/segment.

SUMMARY OF THE INVENTION

To overcome the limitations in the prior art described above, and to overcome other limitations that will become apparent upon reading and understanding the present specification, the present invention discloses a network repeater having automatic speed switching capability.

The present invention solves the above-described problems by providing a first repeater logic means for connecting devices operating at the first rate to a first backplane, a second repeater logic means for connecting devices operating at a second rate to a second backplane, and a port switching fabric, coupled to the first and second repeater logic means, for determining the transmission rate of a signal at a port and routing the signal to one of the repeater logic according to the transmission rate determination.

One aspect of the present invention is that the repeater includes an integrated serial controller for accessing internal management counters, control and status information.

Another aspect of the present invention is that the repeater includes LEDs for providing status information about the repeater.

Yet another aspect of the present invention is that the repeater includes a media access controller for controlling functions including the transmission, loopback and reception of Ethernet frames.

Another aspect of the present invention is that the repeater includes a direct memory access controller for servicing the media access controller and controlling memory.

Still another aspect of the present invention is that a direct memory access controller transfers data from the receive FIFO to memory during a reception, and from memory to a transmit FIFO during transmission.

Another aspect of the present invention is that a dual buffer ring structure manages the transmit and receive traffic.

Another aspect of the present invention is that a link list structure could be used to chain frames between repeaters of different transmission rates on different backplanes.

Another aspect of the present invention is that a buffer area is disposed between the two rings in memory to prevent packet fragmentation so that an arriving packet that does not fit within the space allotted between the buffer start address and the ring stop boundary is written past the ring stop boundary until the data buffer is complete and the start of the next frame will be wrapped to the ring's start address.

Still another aspect of the present invention is that the repeater includes bridging means having a receiving and forwarding state, the receiving state for receiving signals from remote media access control managers and the forwarding state for responding to remote media access control managers.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the exemplary embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides a repeater which automatically switches to either a 10 Mbps backplane/segment or a 100 Mbps backplane/segment.

Figure 1:
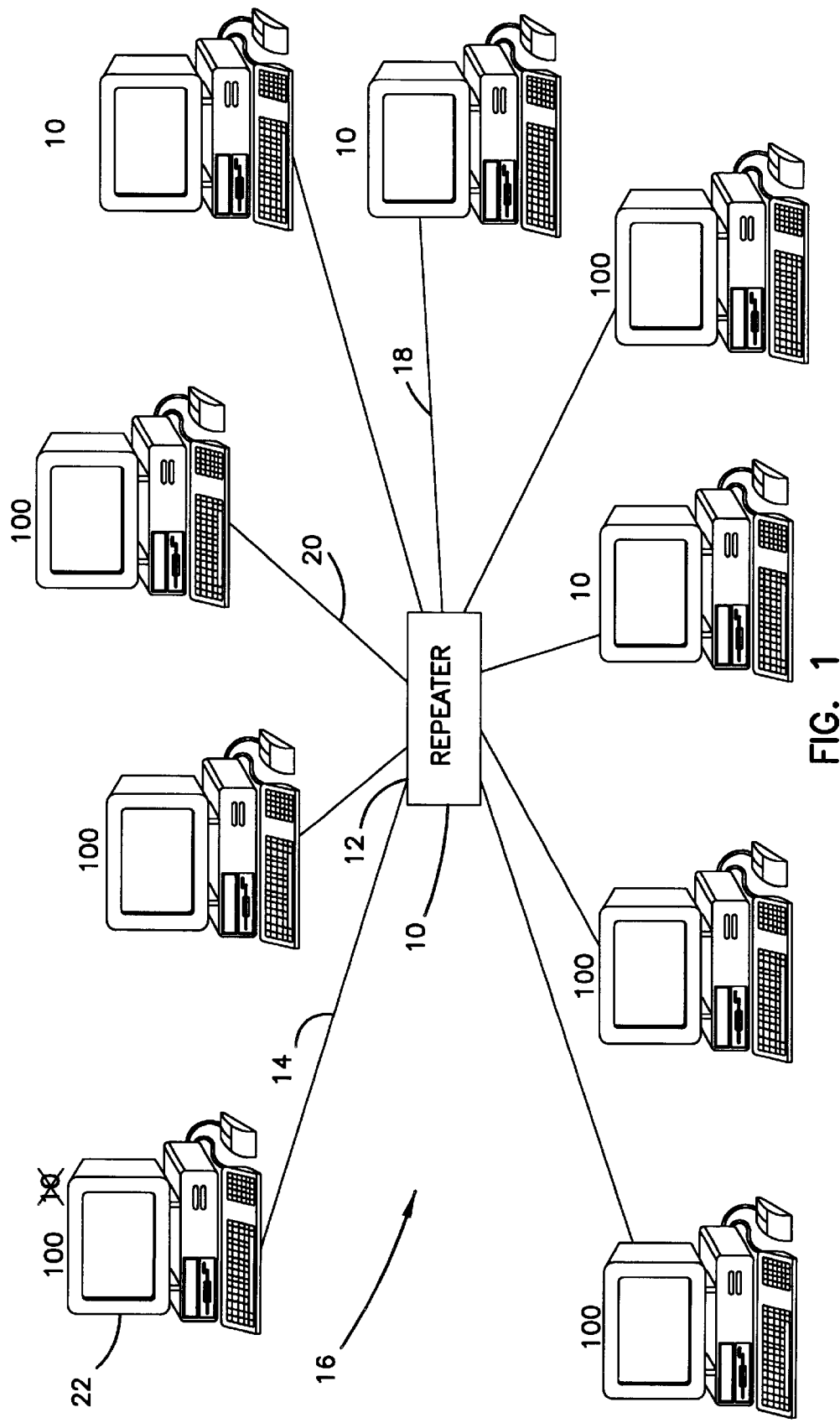
FIG. 1 illustrates an automatic speed switching repeater according to the present invention.

FIG. 1 illustrates a fully integrated IEEE 802.3 repeater incorporating both 10 and 100 Mbit/sec functionality. The repeater has several ports 12 which are connected to physical media segments 14 that make up the Ethernet system 16. Some of the media segments 18 provide twisted pair paths for transmission rates of 10 Mbps. Other media segments 20 provide a path to 100 Mbps devices. When a device 22 is changed from 10 Mbps to 100 Mbps no wiring or altering of connections is necessary. The repeater 10 automatically provides functionality to the new 100 Mbps device 22.

Figure 2:
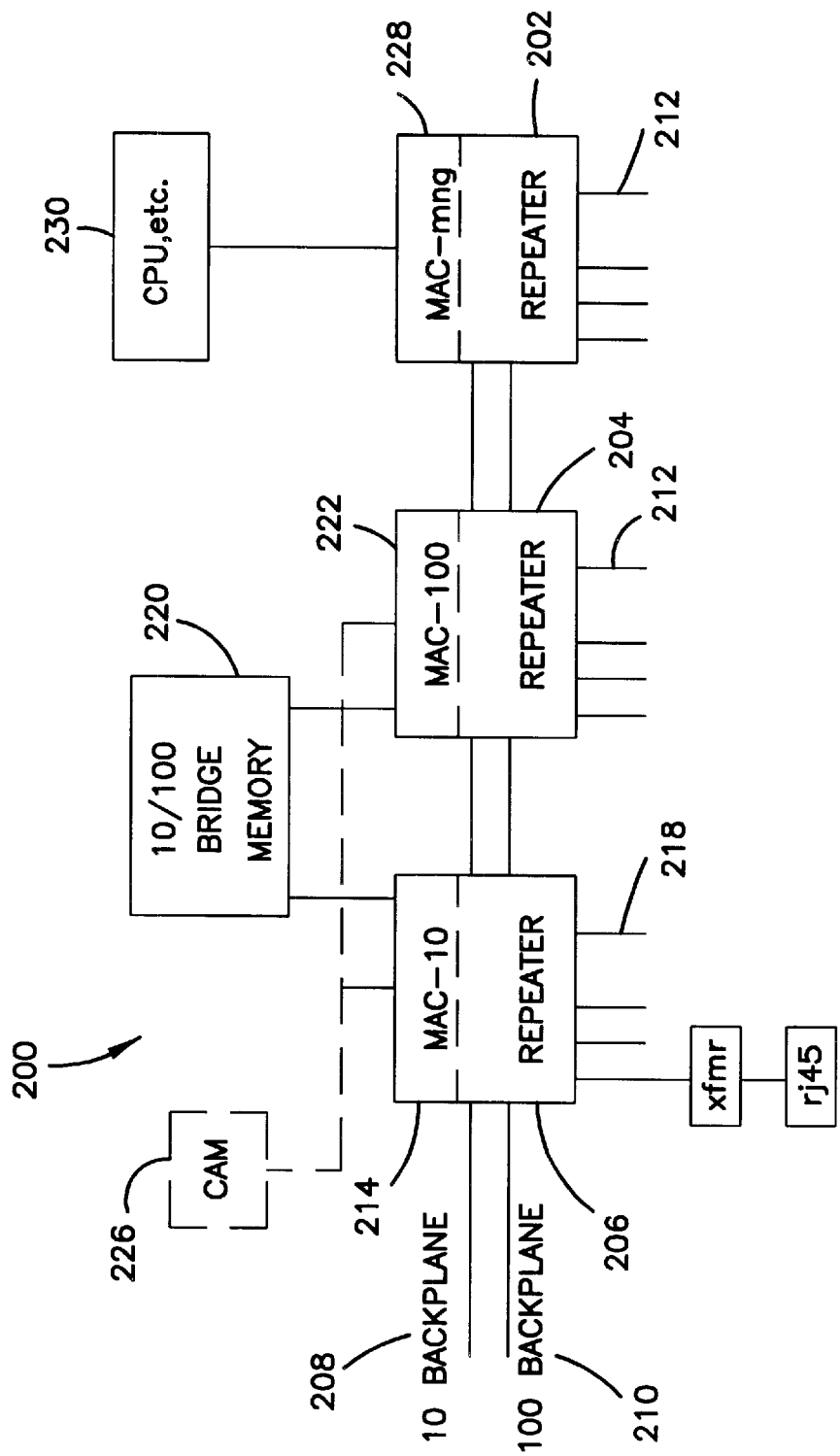
FIG. 2 illustrates an exemplary system architecture using an automatic speed switching repeater according to the present invention.

FIG. 2 illustrates an exemplary system architecture 200 according to the present invention. In FIG. 2, three repeaters 202, 204, 206, according to the invention, are connected to a 10 Mbps backplane 208 and a 100 Mbps backplane 210. Each repeater is connected to distinct media segments 212.

The repeater includes on-board, fully 802.3 compliant media access controller (MAC) entities 214, 222. These units perform the media access control functions for the transmission, loopback and reception of Ethernet frames. A MAC utilizes both a transmit and receive FIFO to provide latency for a DMA controller which services the MAC. During transmission, the MAC may take standard LLC frames (provided by the DMA) and serialize the data. The hardware may then append a preamble followed by a Start of Frame Delimiter, as a header to the outgoing data. In addition, the hardware can optionally append a computed Frame Check Sequence to the end of the outgoing frame for error detection purposes.

When a device operating at 10 Mbps is connected to a repeater 206, and that device's signal is to be repeated and routed to a 100 Mbps device connected to a port on repeater 204, the media access controller 214 in 10 Mbps repeater 206 routes a signal to a 10/100 bridge memory 220 which in turn bridges the signal to the media access controller 222 in 100 Mbps repeater 204.

Each of the media access controllers 214, 222 are connected to content addressable memory (CAM) 226. The content addressable memory 226 is a storage device which includes comparison logic with each bit of storage. A data value is broadcast to all words of storage and compared with the values there. Words which match are flagged in some manner, and subsequent operations can then work on flagged words. Furthermore, the repeater may act as a media access controller management device 228. Thus, management commands may be routed from the repeater 202 to CPU 230.

Figure 3:
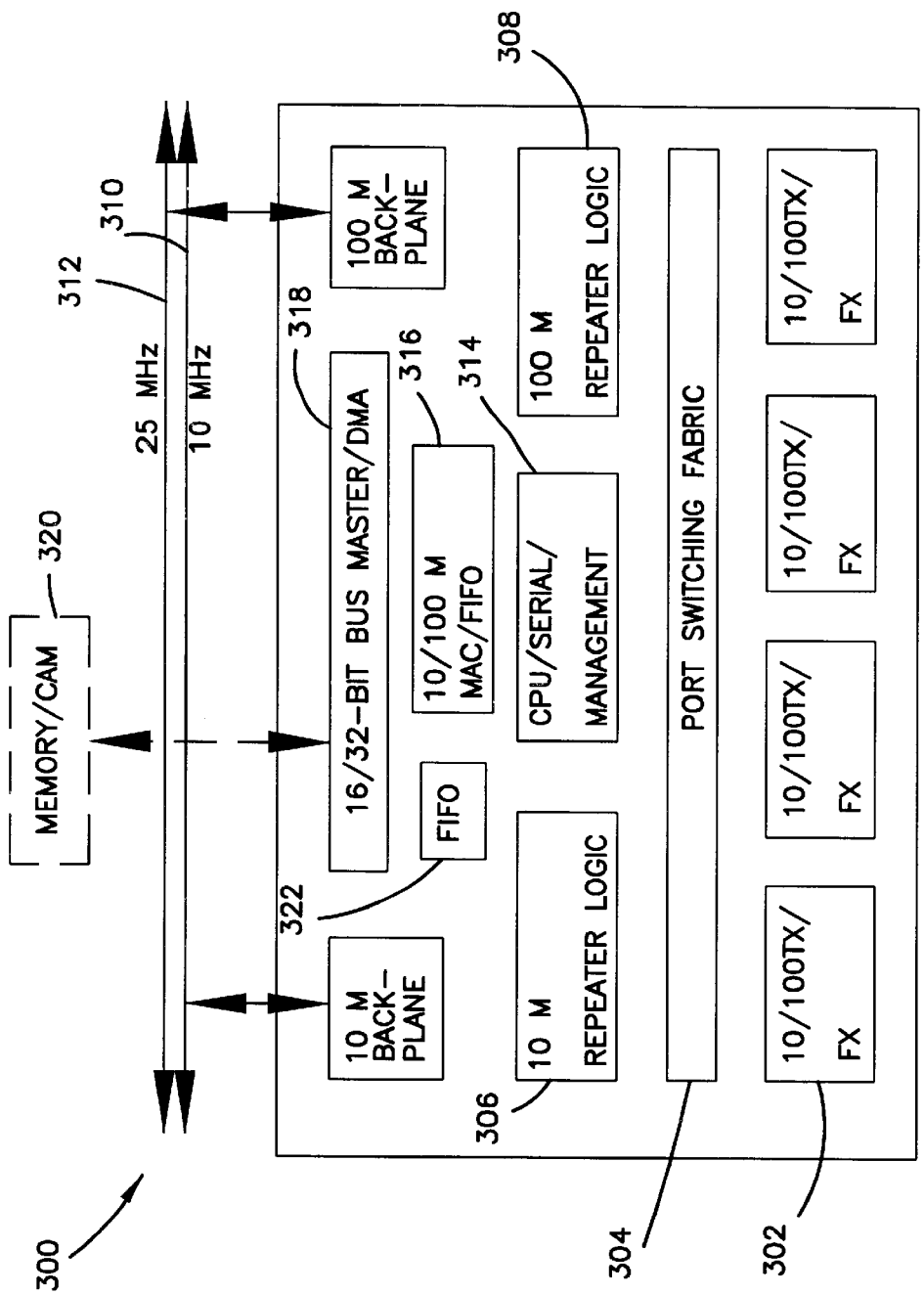
FIG. 3 illustrates the chip architecture of an automatic speed switching repeater according to the present invention.

FIG. 3 illustrates the chip architecture 300 of a repeater according to the present invention. The repeater contains ports 302 for connection to 10 Mbps twisted pair, 100 Mbps twisted pair or fiber optics (coax can be used at 10 Mbps connections). The ports 302 route the signals to port switching fabric 304 which provides the auto negotiation functionality.

The auto-negotiation functionality, as defined in IEEE Std 802.3u/D4-1995 (Draft supplement to ISO/IEC 8802-3:1993 ANSI/IEEE Std 802.3-1993 ed.), herein incorporated by reference, negotiates the transmission rate at each port and routes the signal to the appropriate repeater.

Auto-Negotiation is defined in Clause 28 of the D4 draft of the ANSI/IEEE Std 802.3 MAC Parameters, Physical Layer, Medium Attachment Units and Repeater for 100

Mbps Operation. The Auto-Negotiation program takes control of the cable when a connection is established to a network device and detects the various modes that exist in the device on the other end of the wire.

Auto-Negotiation acts like a rotary switch that automatically switches to the correct technology, such as 10BASE-T, 100BASE-TX, 100BASE-T4, or a corresponding Full Duplex mode. Once the performance mode for the device is determined, Auto-Negotiation passes control of the cable to the appropriate technology and becomes transparent until the connection is broken.

The primary benefit of Auto-Negotiation is the automatic connection of the appropriate performance technology without any intervention from a user, manager, or management software. As new nodes are connected which have 100 Mbps functionality, the port switching fabric of the present invention determines whether the port is transmitting at 10 Mbps or 100 Mbps and routes the signal to the proper repeater logic 306, 308.

The basic mechanism that Auto-Negotiation uses to advertise a device's abilities is a series of link pulses which encode a 16 bit word, known as a Fast Link Pulse (FLP) Burst. An FLP Burst is composed of 17 to 33 link pulses which are identical to the link pulses used in 10BASE-T to determine whether a link has a valid connection (sometimes referred to as Normal Link Pulses or NLPs.) FLP Bursts occur at the same interval as NLPS, 16.8 ms. An FLP Burst may have nominal duration of 2 ms.

An FLP Burst interleaves clock pulses with data pulses to encode a 16 bit word. The absence of a pulse within a time window following a clock pulse encodes a logic zero and a pulse within the time window following a clock pulse encodes a logic one.

The key to Auto-Negotiation's flexibility and expendability is the encoding of the 16 bit word. The 16 bit word is referred to as the Link Code Word (LCW). Auto-Negotiation must ensure that the node receives the Link Code Word correctly and that the node's Link Code Word is received correctly in order to make a connection decision. Auto-Negotiation uses the Arbitration function to accomplish this.

Once the port switching fabric 308 has ascertained the transmission rate it routes the Ethernet frame to the appropriate repeater logic 306, 308. 10 Mbps repeater logic 306 and 100 Mbps repeater logic 308 are coupled to the port switching fabric 304. The 10 Mbps repeater logic 306 routes a signal onto the 10 Mbps backplane 310. The 100 Mbps repeater logic 308 routes a signal to the 100 Mbps backplane 312. The repeater 300 also includes CPU/serial/management functionality 314 along with FIFO buffers 316. A 16 or 32 bit bus master direct memory access 318 is coupled to memory 320 which may be external to the repeater chip itself.

Since the repeater uses the CSMA/CD access method, collisions are a fact of life. In the event of a transmit collision, the repeater will wait a random amount of time, as determined by the Truncated Binary Exponential Backoff Algorithm, before retransmitting the frame.

The repeater 300 takes the serial bit stream coming from the port switching fabric 304, strips off the preamble/SFD header, and deserializes the data into word quantities. This data passes into the receive FIFO 316 where it awaits service from its supporting DMA channel 318. At the end of reception, the repeater checks for any errors that may have occurred (such as CRC and length errors) and may provide the user with the ability to filter the errored packet.

As mentioned above, the repeater contains an on-board DMA macro 318 which transfers data from a receive FIFO 316 to memory 320 during a reception, and from memory 320 to a transmit FIFO 322 during transmission. All repeater bus master activity takes place in block sizes which can be programmed by the user.

The repeater uses a buffer ring structure to manage both the transmit and receive traffic. Two static registers and two dynamic registers govern the smooth operation of a ring. The amount of address space dedicated to a particular ring structure may be defined by the Ring Start (RSTRT) and Ring Stop (RSTP) registers. These pointers are setup by the software during initialization. The other two registers define a Current Pointer (CURR) and a Buffer Start Pointer (BSTRT). During reception, the CURR indicates where the receive DMA will write its next word transfer. The BSTRT contains the address pointing to the beginning of the current frame being received. This allows the DMA to quickly recover its pointers should the MAC reject the incoming data. During transmission, the CURR indicates where the transmit DMA is currently reading from (or writing to) in memory. Similarly, the BSTRT is a pointer to the starting address of the current transmit buffer. This provides an easy mechanism for retransmitting frames that experience collisions.

In one embodiment of the present invention two restraints are associated with management of system memory. A first constraint involves the programming of certain registers within the repeater. First, ring boundaries are set preferably on 2048 byte pages. Second, data buffers start preferably on 8 byte boundaries. Thus, the repeater's addressable memory is broken up into sixteen 64 kbyte blocks. The user may select which block will be accessed by programming the page registers.

The second constraint involves the lack of packet fragmentation within a ring buffer. Space should be left between any two rings in memory. The amount of space should be large enough to encompass the interface's MTU size plus descriptor (2 kbytes) plus an additional 2 kbytes. This is needed for the cases when an arriving packet will not fit within the space allotted, between the buffer start address and the ring stop boundary. Rather than have the hardware fragment the packet by wrapping the overflow data back around to the beginning of the ring, the packet will instead be written past the ring stop boundary until the data buffer is complete. The start of the next frame will be wrapped to the ring's start address. This eases the processing burden of software since it is much easier to deal with the non-fragmented blocks.

Figure 4:
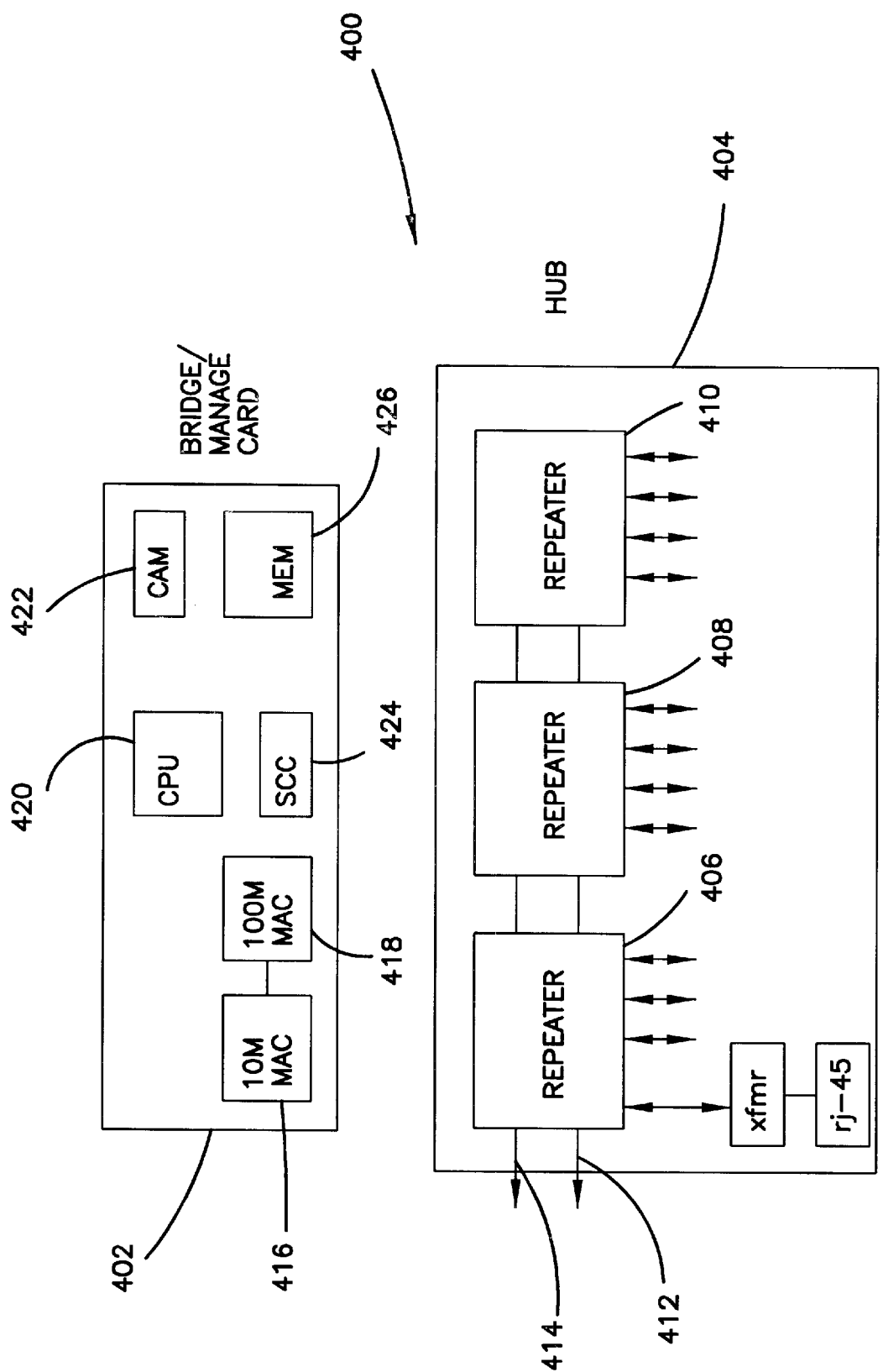
FIG. 4 illustrates a second embodiment for a system architecture using an automatic speed switching repeater according to the present invention wherein an external bridge/manage card is provided.

FIG. 4 illustrates an alternative systems architecture embodiment 400 wherein a bridge/manage card 402 is provided external to the hub 404. Each repeater 406, 408, 410 within the hub is programmed to provide functionality for the two backplanes 412, 414. The repeater routes the signal to an appropriate media access controller 416, 418 in the bridge/manage card. The 10 MPBS media access controller 416 communicates with the 100 media access controller 418 using the bridging technique discussed earlier. The CPU 420, content addressable memory 422, the serial controller 424, and an additional memory 426 for storing packets are also provided in the bridge manage card 402.

Figure 5:
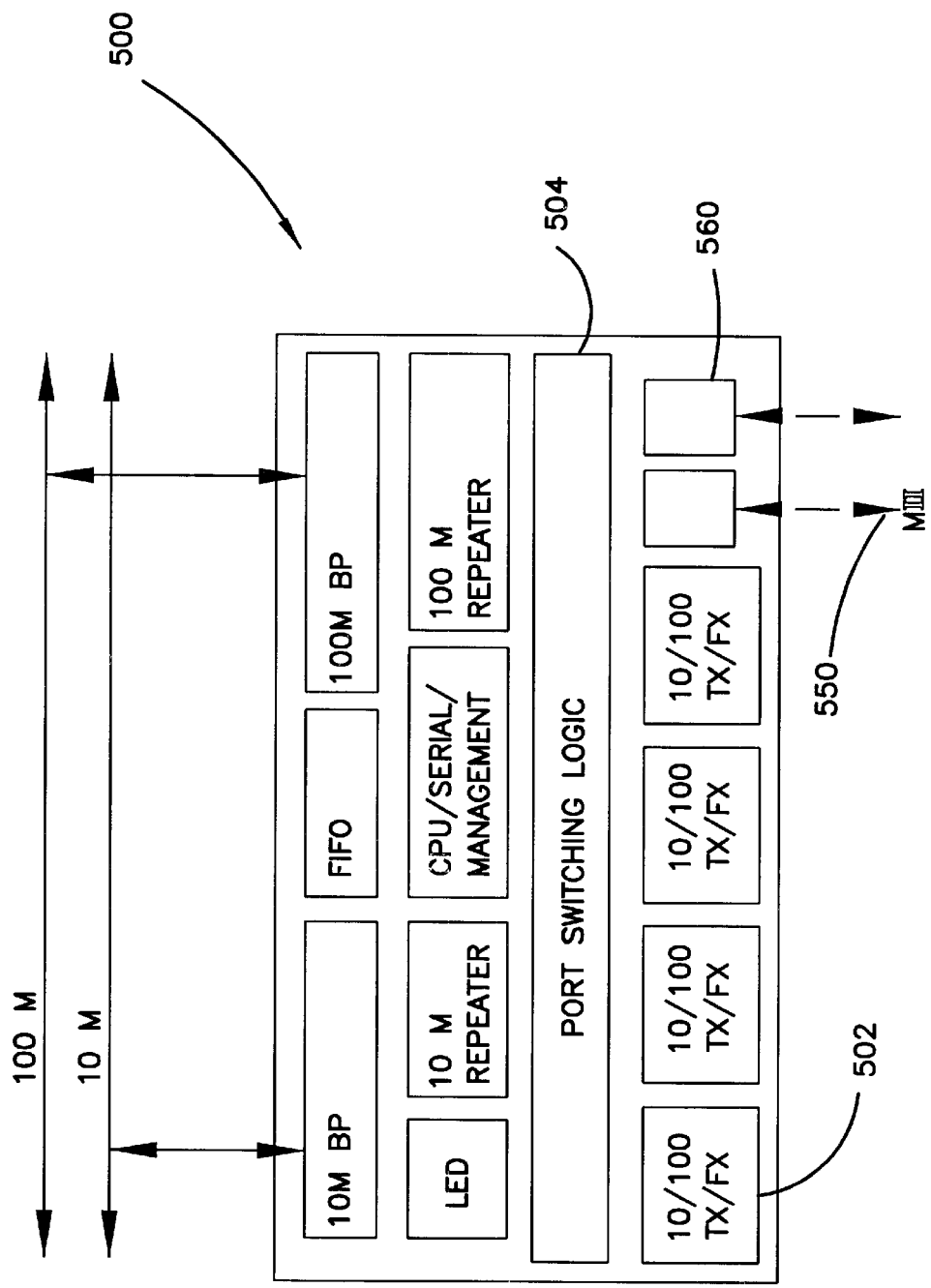
FIG. 5 illustrates an alternative chip architecture for an automatic speed switching repeater according to the present invention.

FIG. 5 illustrates an alternative chip architecture 500 according to the present invention. The repeater contains ports 502 for connection to 10 Mbps twisted pair, 100 Mbps twisted pair or fiber optics. The ports 502 route the signals to port switching fabric 504 which provides the auto negotiation functionality.

The repeater may also include a media independent interface 550. The medium independent interface 550 is a set of electronics that provides a way to link the Ethernet medium access control functions in the network device 500 with the physical layer device that sends signals onto the network medium. A medium independent interface 550 may optionally support both 10 Mbps and 100 Mbps operation, allowing suitably equipped network devices to connect to both 10 base-T and 100 base-T twisted paramedia segments.

The medium independent interface 550 is designed to make the signaling differences among the various media segments transparent to the Ethernet chips in the network device. The medium independent interface 550 converts the line signals received from the various media segments by the transceiver into digital format signals that are then provided to the Ethernet chips in the device. The repeater may also include LED drivers 560 for providing status communication to the user.

Figure 6:
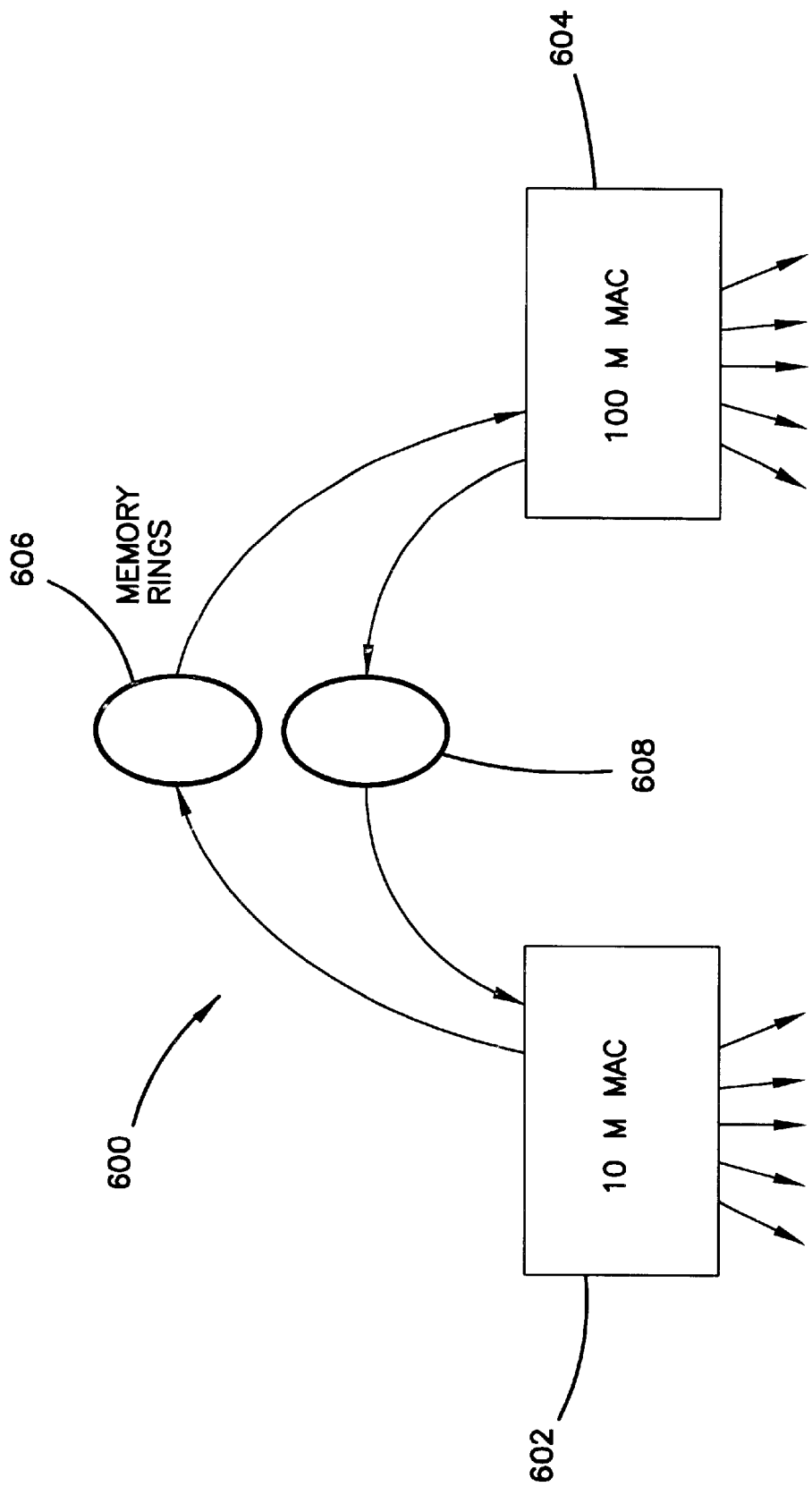
FIG. 6 illustrates automatic bridging between a 10 Mbps media access controller and a 100 Mbps media access controller according to the present invention.

FIG. 6 illustrates the automatic bridging 600 between a 10 Mbps media access controller 602 and a 100 Mbps media access controller 604. Signals are routed between the 10 Mbps media access controller 602 and the 100 Mbps media access controller 604 using memory rings 606, 608.

As part of the Simple Network Management Protocol (SNMP), a supporting management device must be able to both receive and respond to a remote manager's request for statistical information. Accordingly, an on-board MAC is needed to process these management frames. To complete the repeater Hub Management system, a CPU running SNMP software must be provided. The CPU interprets the SNMP management frames and provides all requested information. This is accomplished by accessing the repeater statistical data base and passing all pertinent data into an SNMP frame, and then sending the packet back to the requesting manager. The DMA macro frees up more bus bandwidth, as well as simplifies any driver software.

While the QFR bridge is in its forwarding state, there are two possibilities modes of operation: (1) operation with CPU intervention; and (2) operation without CPU intervention.

1. Bridging using the CPU

The MAC in the receiving port must lock on to the Start of Frame Delimiter of an 802.3 packet. Next, the nature of the current frame must be determined via its destination address. This information is given to the receive DMA channel so it can set up the correct pointers in memory.

After the number of bytes received has exceeded a programmable threshold level, a receive bus master will request service from a DMA. After the DMA buffers both data and descriptor information to memory, the bus master may interrupt the host to indicate that an Ethernet frame is ready to be forwarded. Upon receiving an interrupt, the CPU pushes its flags and instruction pointer onto its stack, access its interrupt table, and begin executing the correct Interrupt Service Routine (ISR). During this particular service routine, the CPU acquires the bus and performs a read cycle to the receive DMA in order to determine where in memory the frame can be found. Once this buffer address has been determined, the CPU can begin to transfer data to a MAC-only slave device found at the bridge's other port(s). In order to complete the block data transfer, two options exist: (1) Use a DMA channel; or (2) Use CPU memory cycles.

a. Using a DMA Channel

If an embedded processor (such as a 186) is used as the resident CPU, at least one internal DMA channel is available to the programmer. After the CPU gets an indication that a frame is ready to be forwarded, a DMA channel may be setup to take care of the block transfer.

b. Using CPU Memory Cycles

The alternative to using a DMA macro is for the CPU to perform memory to register transfers, followed by a register to IO instruction. This requires that the CPU first bring the data bound for the network into an internal register, then transfer that data to a MAC-only slave device.

2. Bridging with No CPU Intervention

Strictly speaking, the CPU will more than likely have some involvement in the forwarding process, albeit a very minimal one. The alternative to using a CPU in the forwarding process, is to instead use a device which has an on-board DMA macro that can "speak" the same protocol as the repeater's DMA. In this situation, the bus bandwidth utilization becomes much more efficient. A bus master's DMA is able to perform bus cycles at a rate that is only limited by its target device's response time, in this case, the SRAM's cycle time. Accordingly, the latter of the two approaches is preferable.

a. QFR Bridging Using a Companion Device

The memory structure used by the repeater consists of a logical ring plus pointers. The primary responsibility of maintaining these ring's falls on the writing device, or the Receive Bus Master. The receive bus master will keep pointers which define the rings upper and lower bounds, the start of the current frame's buffer, the location of where the next frame will be stored, and the actual location of the current write pointer.

Figure 7:
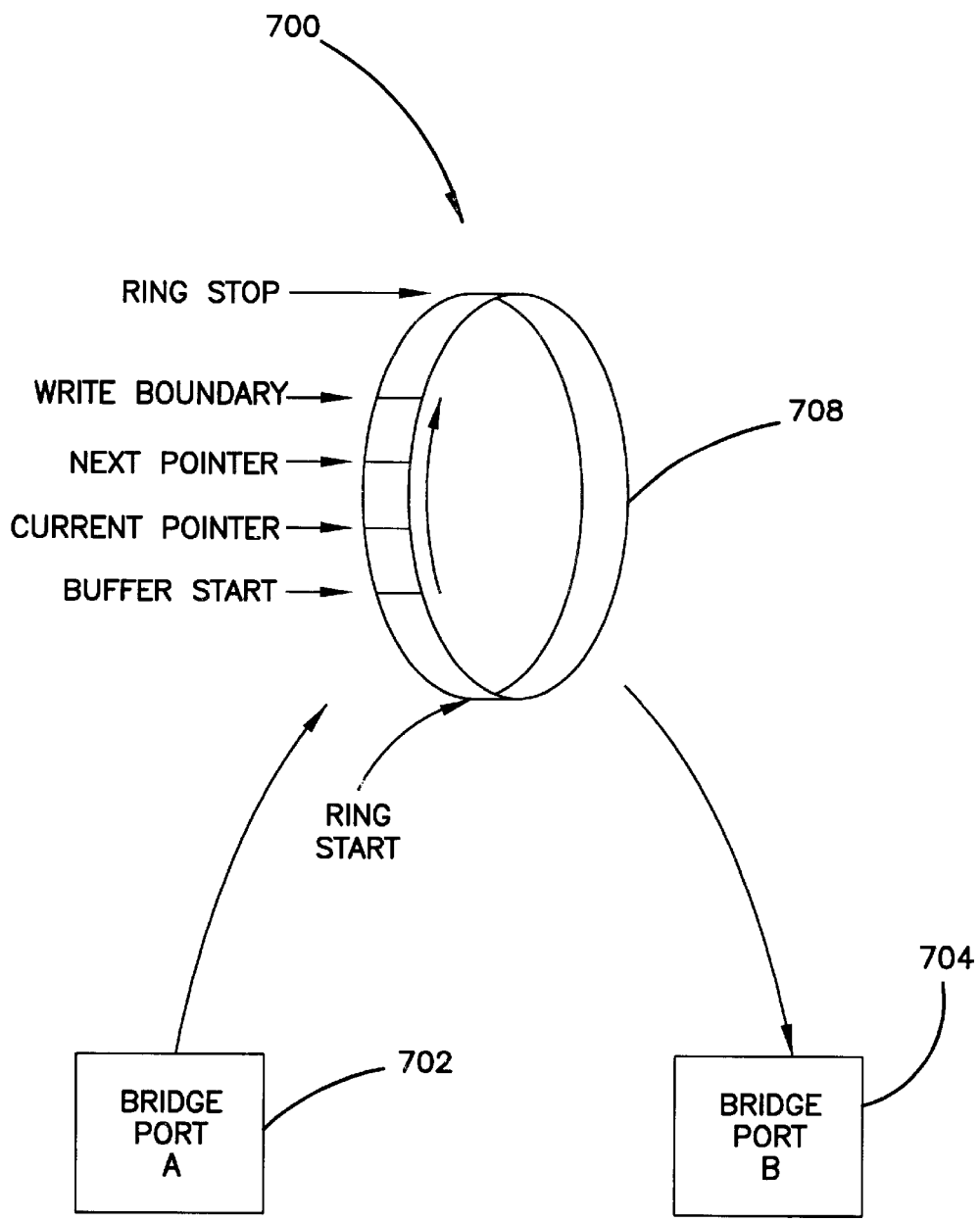
FIG. 7 illustrates a logical DMA channel according to the present invention.

Within the bridge, the receiving bus master of one port will communicate with a transmitting bus master of another port. This communication between the ports may be considered a single logical DMA channel. A transmitting device on the other port will maintain a similar set of registers as that found in a receive bus master. FIG. 7 shows a graphical representation 700 of a logical DMA channel 708 from a receive device in port A 702 to a transmit device in port B 704.

Figure 8:
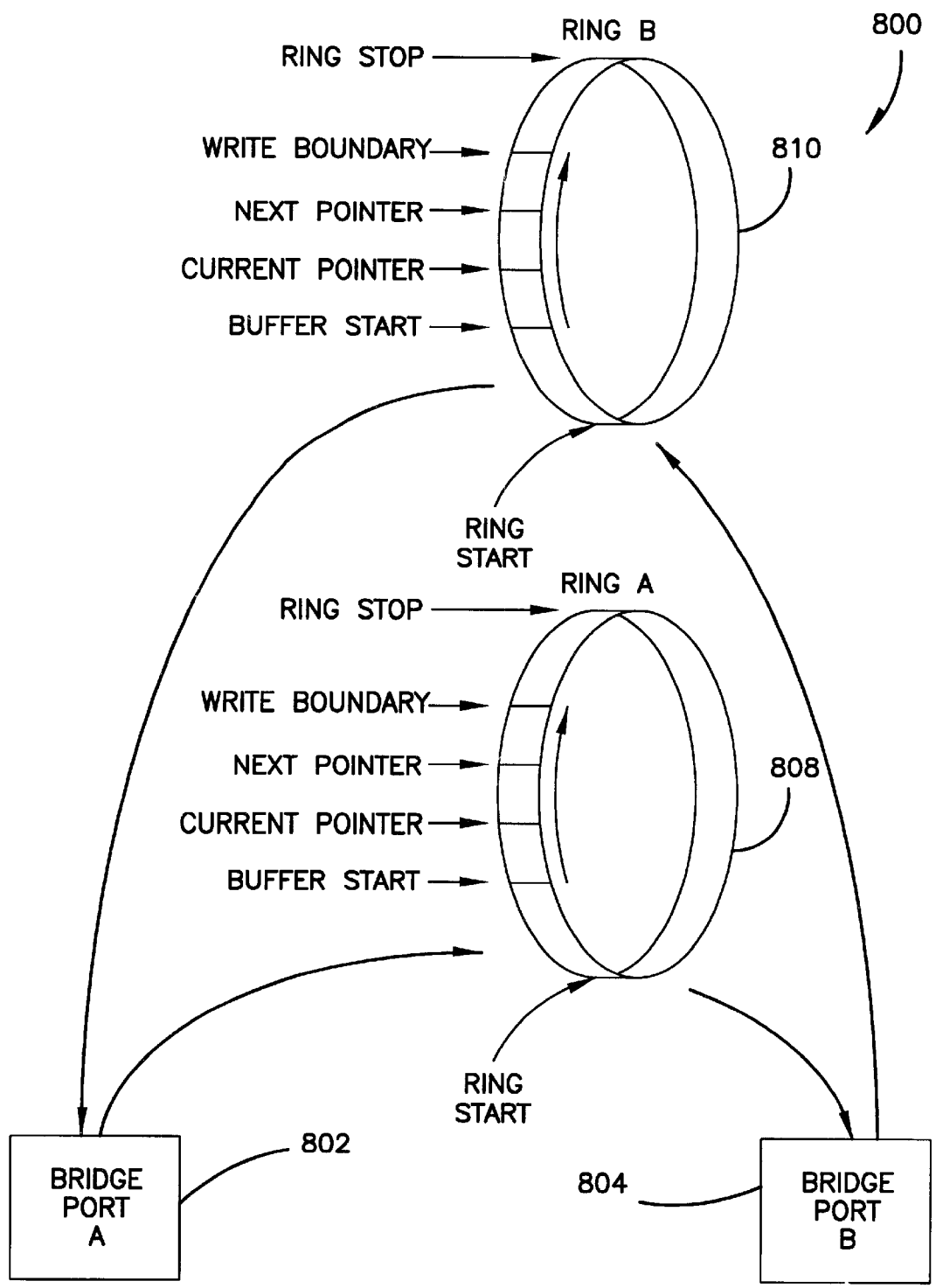
FIG. 8 illustrates a ring managed, two-channel DMA bridge according to the present invention.
Figure 9:
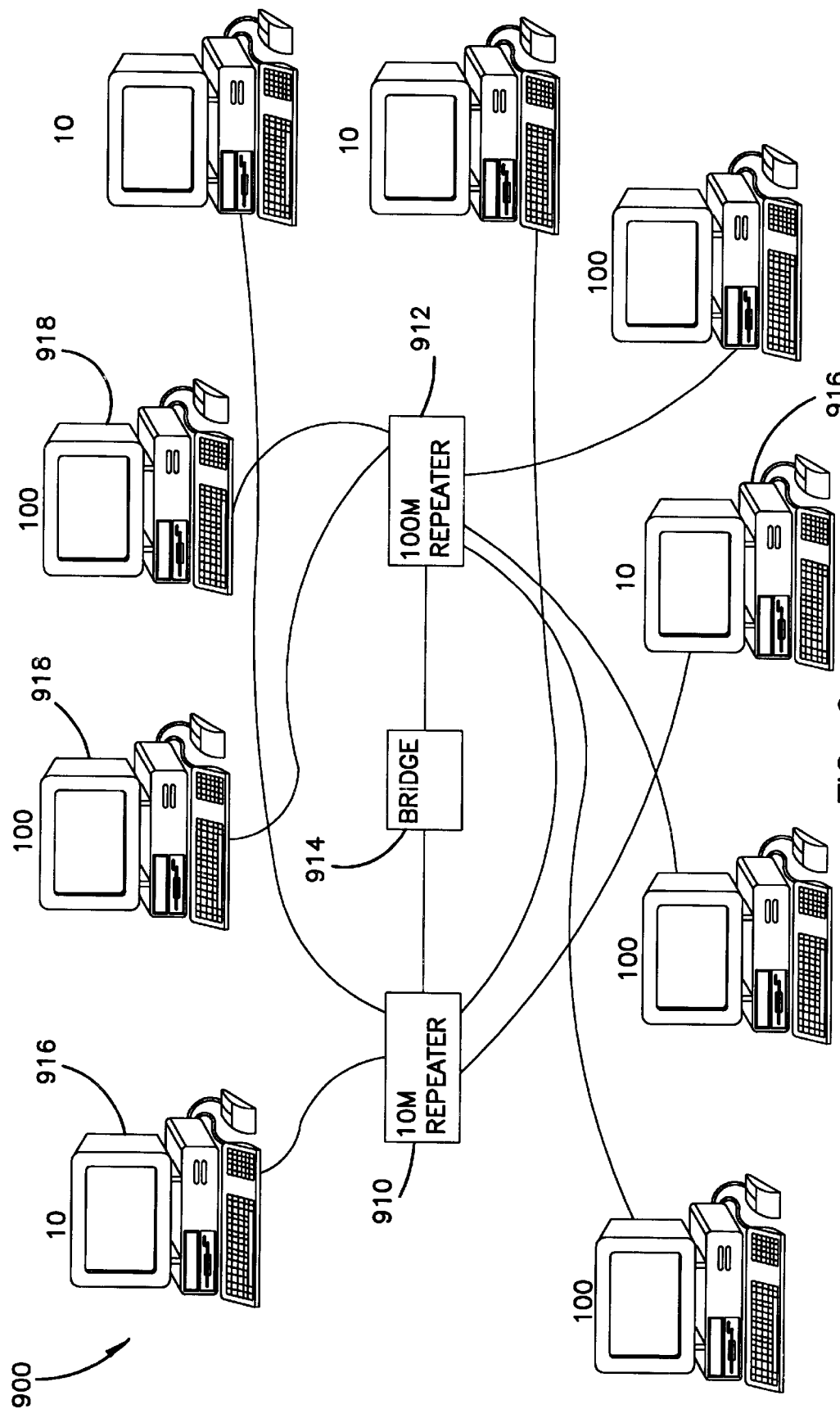
FIG. 9 illustrates a prior art solution for providing 100 Mbps functionality in a network system along with 10 Mbps functionality.

A bridge that is 802.1d compliant must be able to forward traffic in both directions, that is, from port A 702 to port B 704 and from port B 704 to port A 702. The second data path can be supported through a second logical DMA channel. FIG. 8 shows a ring managed, two-channel DMA bridge 800.

In order to support a second DMA channel, another logical ring 810 must be created in memory. For the example shown in FIG. 8, this new ring structure 810 would be managed by the writing bus master, or port B's 804 receive device.

The main responsibility of an 802.1d compliant bridge is to forward traffic of unknown destination and to reject all others. However, since a MAC layer bridge contains the MAC entities needed to gain access to the particular working group supported (i.e. Ethernet, Token Ring, Token Bus . . . ), the bridge then also has the ability to be uniquely addressed through the MAC entity contained within the bridge. This implies that there are some frames which should not be forwarded to another LAN segment, yet neither should they be rejected. Such frames can be regarded as Host traffic to the bridge. That is, they were addressed to the bridge, and no one else.

In the case of the repeater, the best example of Host traffic is that of SNMP in-band management frames. The term in-band means that the remote manager uses the media on which it is gathering statistics to transfer the SNMP frames. When an SNMP packet arrives, it is not forwarded. Instead, it is routed to a region of memory that has been reserved for Host traffic. Once the DMA activity has stopped, the CPU is given a maskable interrupt indicating that Host traffic has just arrived. As part of the descriptor field, the status of the reception, including address match information will be available to the CPU for inspection. The CPU will need to check this field in order to discern what type of MAC frame was just received.

A second type of MAC traffic could be seen by the repeater bridge. A second example of Host traffic is due to the support of the Spanning Tree protocol. Whenever bridges running the Spanning Tree need to communicate with one another, a Bridge Protocol Data Unit (BPDU) is used. Bridges will use BPDUs to communicate changes in the LAN topology, thereby causing a re-evaluation of the best routes a data packet can take. Bridge protocol data units are used to help a bridge decide which port offers the shortest path back to the Spanning Tree's root bridge.

The BPDU is addressed to an 802.1d group address. That is, it does not uniquely identify a port, but instead it identifies a unique group; i.e., all 802.1d compliant bridges. Therefore, the frequency of receiving Host traffic could be non-trivial if there are a lot of bridges around the network. As a result, the repeater may support a third DMA channel which can transfer Host frames to a ring within a different region of memory. A ring structure is provided so that the CPU could be given enough time to process the buffered Host frames.

Regardless of the type of Host traffic, the repeater bridge must be able to source packets from memory. When the software has completed building a packet in the Host traffic region of memory, it gives a transmit indication to the bus master through a slave write to the control register. This ability to source Host traffic to any port creates an effective fourth DMA channel.

Each companion chip must share its current pointers with the other. Communication between bus masters may be provided using a semaphoring scheme as disclosed in co-pending patent application, Ser. No. 08/528,112, entitled METHOD AND APPARATUS FOR IMPLEMENTING A TWO-PORT ETHERNET BRIDGE USING A SEMAPHORING TECHNIQUE, which is incorporated by reference herein. A receiving media access controller receives a data packet on a first port. The receiving Media Access Controller places the packet into structure in memory (by performing an access cycle on the bus). The receiving Media Access Controller then indicates the presence of that packet to the transmitting Media Access Controllers by executing a bus cycle to one of the first unique address(es). Subsequently the transmitting Media Access Controller device transmits that packet to users attached to its ports. The transmitting Media Access Controller then signals back to the receiving Media Access Controller that the packet has been transmitted and that the space in memory which it occupied is now available, by executing a bus cycle to the other (second) unique address. The receiving Media Access Controller is now free to use that space for new packets that it may receive.

The two unique addresses that are used by the Media Access Controllers to communicate with each other are programmed into registers on each device. By building the memory structure as a ring, and by defining a register known as the "Write Boundary" register the two Media Access Controllers are able to pass packets back and forth indefinitely. Each new packet is put into the ring just after the previously received packet. The Write Boundary register indicates the point in the ring past which packets previously received by the first Media Access Controller have not yet been transmitted by the second Media Access Controller. Whenever the transmitting Media Access Controller signals that it has transmitted a packet back to the receiving Media Access Controller, it also updates the Write Boundary register of the receiving Media Access Controller. This is done by transmitting the valve of the Write Boundary register during the data portion of the bus cycle.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A repeater having a plurality of ports for providing connections between media segments coupled thereto, comprising:
   ten megabit per second (Mbit/s) repeater logic for connecting ten megabit per second devices to a ten megabit per second backplane;
   one hundred megabit per second (Mbit/s) repeater logic for connecting one hundred megabit per second devices to a one hundred megabit per second backplane; and
   a port switching fabric, coupled to the ten megabit per second repeater logic and to the one hundred megabit per second repeater logic, for determining the transmission rate of a signal at a port and routing the signal to one of the repeater logic according to the transmission rate determination;
   a media access controller (MAC) for controlling functions including the transmission, loopback and reception of Ethernet frames;
   a direct memory access (DMA) controller for servicing the media access controller and controlling memory; and
   a transmit and receive FIFO, coupled to the MAC, for providing latency for the DMA controller.

2. The repeater of claim 1 further comprising an integrated serial controller for accessing internal management counters, control and status configuration information.

3. The repeater of claim 1 further comprising an LED blink scheme for providing status information about the repeater.

4. The repeater of claim 1 wherein the media access controller comprises a receiver for receiving a serial bit stream of data through a port, striping off the preamble/SFD header from the data stream, and deserializing the data stream into word quantities.

5. The repeater of claim 4 wherein the FIFO buffer receives the deserialized data from the media access controller before service by the direct memory access controller.

6. The repeater of claim 1 wherein the direct memory access controller transfers data from the receive FIFO to memory during a reception, and from memory to a transmit FIFO during transmission.

7. The repeater of claim 6 further comprising a dual buffer ring structure for managing the transmit and receive traffic.

8. The repeater of claim 7, wherein the dual buffer ring structure further comprises two static registers and two dynamic registers.

9. The repeater of claim 8 wherein the registers are programmed so that the ring boundaries are on 2048 byte pages and the data buffers start on 8 byte boundaries.

10. The repeater of claim 8 further comprising a buffer area disposed between the two rings in memory to prevent packet fragmentation so that an arriving packet that does not fit within the space allotted between the buffer start address and the ring stop boundary is written past the ring stop boundary until the data buffer is complete and the start of the next frame will be wrapped to the ring's start address.

11. The repeater of claim 1 further comprising bridging means having a receiving and forwarding state, the receiving state for receiving signals from remote media access control managers and the forwarding state for responding to remote media access control managers.

12. A repeater having a plurality of ports for providing connections between media segments coupled thereto, comprising:
   a plurality of backplanes operating at different transmission rates;
   a plurality of repeater logic means, coupled to the plurality of backplanes, for connecting a device to at least one of the backplanes;
   a port switching fabric, coupled to the plurality of repeater logic means, for determining the transmission rate of the device at a port and routing a signal from the device to a repeater logic means according to the transmission rate determination; and
   bridging means, coupled to the repeater logic means, for bridging signals between the repeater logic means;
   a media access controller (MAC) for controlling functions including the transmission, loopback and reception of Ethernet frames;
   a direct memory access (DMA) controller for servicing the media access controller and controlling memory; and
   a transmit and receive FIFO, coupled to the MAC, for providing latency for the direct memory access controller.

13. The repeater of claim 12 further comprising a serial controller for accessing internal management counters, control and status configuration information.

14. The repeater of claim 12 further comprising LED for providing status information about the repeater.

15. The repeater of claim 12 wherein the media access controller further comprises a receiver for receiving a serial bit stream of data through a port, striping off the preamble/SFD header from the data stream, and deserializing the data stream into word quantities.

16. The repeater of claim 15 wherein the FIFO buffer receives the deserialized data from the media access controller before service by the direct memory access controller.

17. The repeater of claim 12 wherein the direct memory access controller transfers data from the receive FIFO to memory during a reception, and from memory to a transmit FIFO during transmission.

18. The repeater of claim 17 further comprising a dual buffer ring structure for managing the transmit and receive traffic.

19. The repeater of claim 18 wherein the dual buffer ring structure further comprises two static registers and two dynamic registers.

20. The repeater of claim 19 wherein the registers are programmed so that the ring boundaries are on 2048 byte pages and the data buffers start on 8 byte boundaries.

21. The repeater of claim 19 further comprising a buffer area disposed between the two rings in memory to prevent packet fragmentation so that an arriving packet that does not fit within the space allotted between the buffer start address and the ring stop boundary is written past the ring stop boundary until the data buffer is complete and the start of the next frame will be wrapped to the ring's start address.

22. A repeater having a plurality of ports for providing connections between media segments coupled thereto, comprising:
   a plurality of backplanes operating at different transmission rates;
   a plurality of repeater logic means, coupled to the plurality of backplanes, for connecting a device to at least one of the backplanes;
   a port switching fabric, coupled to the plurality of repeater logic means, for determining the transmission rate of the device at a port and routing a signal from the device to a repeater logic means according to the transmission rate determination;
   bridging means, coupled to the repeater logic means, for bridging signals between the repeater logic means; and
   a media access controller for controlling functions including the transmission, loopback and reception of Ethernet frames, the media access controller comprising a receiver for receiving a serial bit stream of data through a port, striping off the preamble/SFD header from the data stream, and deserializing the data stream into word quantities.

23. A repeater having a plurality of ports for providing connections between media segments coupled thereto, comprising:
   ten megabit per second (Mbit/s) repeater logic for connecting ten megabit per second devices to a ten megabit per second backplane;
   one hundred megabit per second (Mbit/s) repeater logic for connecting one hundred megabit per second devices to a one hundred megabit per second backplane; and
   a port switching fabric, coupled to the ten megabit per second repeater logic and to the one hundred megabit per second repeater logic, for determining the transmission rate of a signal at a port and routing the signal to one of the repeater logic according to the transmission rate determination; and
   a media access controller for controlling functions including the transmission, loopback and reception of Ethernet frames, the media access controller comprising a receiver for receiving a serial bit stream of data through a port striping off the preamble/SFD header from the data stream, and deserializing the data stream into word quantities.

* * * * *